United States Patent [19]

Bennett

[11] 4,217,702
[45] Aug. 19, 1980

[54] MATHEMATICAL FUNCTION GRAPHIC DISPLAY

[76] Inventor: Paul W. Bennett, 511 Long Plain Rd., Leverett, Mass. 01054

[21] Appl. No.: 936,499

[22] Filed: Aug. 24, 1978

[51] Int. Cl.³ .............................................. G09B 23/02
[52] U.S. Cl. ......................................... 35/30; 364/861
[58] Field of Search ...................... 35/10, 13, 19 A, 30; 364/810, 861

[56] References Cited

U.S. PATENT DOCUMENTS

| | | | |
|---|---|---|---|
| 2,850,668 | 9/1958 | Katz | 35/19 A |
| 3,124,884 | 3/1964 | Capecelatro et al. | 35/19 A |
| 3,278,736 | 10/1966 | Pastoriza | 35/30 |
| 3,488,862 | 1/1970 | Eckhart | 35/30 |
| 3,570,143 | 3/1971 | Paine | 35/19 A |
| 3,668,380 | 6/1972 | Claxton | 35/19 A |
| 3,996,457 | 12/1976 | Gabriel | 35/30 X |
| 4,021,933 | 5/1977 | Hughes | 35/19 A |
| 4,074,113 | 2/1978 | Gabriel | 364/810 |

*Primary Examiner*—Vance Y. Hum
*Attorney, Agent, or Firm*—William Nitkin

[57] ABSTRACT

An educational graphic display apparatus which, by use of electronic techniques displays graphically a function of a variable. The only programming necessary is the selection of the function type and the setting of coefficient values and a sequence of functions with different coefficient values can be displayed without the necessity of complex reprogramming for each new function. The apparatus of this invention utilizes at least one integrator responsive to a reset control signal and a forward/reverse signal, each of which signals has high and low logic levels, as well as a reset value signal and a voltage input signal. The integrator's output is the sum of (i) a constant, capable of being established by the reset value signal whenever the reset control signal is high, and (ii) a constant times the integral of the voltage input signal over time beginning immediately after the reset control signal has returned to a low logic level after being at a high logic level. In a preferred embodiment of the invention, a number of these integrators are placed in tandem, and limit sensors are provided to sense when signals representative of the display are outside the display limits of the system; the limit sensors are connected to cause appropriately modification of signals going to the integrators whenever an outside limit signal is detected.

1 Claim, 28 Drawing Figures $$R_4 = \frac{R_1 R_3}{2(R_1 - R_3)}$$

MATHEMATICAL FUNCTION GRAPHIC DISPLAY

BACKGROUND OF THE INVENTION

This invention relates to an apparatus for graphical display of a function of a variable, such apparatus utilizing electronic techniques to provide the display.

A function is a correspondence rule: for any allowable "input" number, the function gives a specific "output" number. The functions most used in applied science are definable by a mathematical expression. In the expression a symbol, such as "x", stands for any input value, and this symbol is therefore referred to as a "variable". Another symbol such as "y" can represent the output number, or function value. x is then the independent variable, and y is the dependent variable.

Science and engineering use functions to describe and predict the behavior of the phenomena they deal with. Most naturally occurring phenomena are describable in terms of three general classes of functions: trigonometric, exponentials, and polynomials.

The natural trigonometric functions sine (sin) and cosine (cos) are used to construct functions that model and describe the behavior of oscillatory phenomena. In the following examples the independent variable is time, t.

1. Pendulum motion: $\theta = \theta_m \cos kt$ ($\theta$=angle at time t, $\theta_m$=maximum value of $\theta$, k=frequency coefficient.)

2. Simple business cycle model: $i = i_a + i_v \sin kt$ (i=interest rate at time t, $i_a$=average interest rate, $i_v$=maximum variation from the average, k=frequency coefficient.)

Many natural processes in which the *rate* of increase is itself increasing, or the rate of decrease is decreasing, follow exponential laws:

1. World population growth: $P = P_o e^{0.02(t-t_o)}$ (p=population at year $t$, $p_o$=population at year $t_o$.)
2. Compound interest:

$$A = P(1 + \frac{r}{m})^{mt}$$

(A=accumulated value after t years, P=initial investment, r=annual rate, m=number of times compounded per year.)

In each of the preceding examples the coefficients, i.e. the symbols which represent fixed values, have specific, meaningful "real world" interpretations.

A third class of functions is the polynomials. A polynomial is the sum of terms each consisting of a power of the independent variables multiplied by a constant coefficient, e.g. $x^2+5x$; $3x^4$; $t^3-2t+1$. Polynomials are more in the nature of "man-made" functions than the preceding two classes, but there are natural phenomena that fall into this class:

1. Falling object: $y = y_o - 16t^2$ (y=height at time t, $y_o$=initial height at t=0.)

The main significance of polynomials is that they are the easiest type of function to work with algebraically, and hence are normally the first type taught in high school and college mathematics courses, and are used to introduce the ideas of calculus.

Sometimes basic functions of one type, or of different types, are combined to form more complex functions:

1. AM radio wave: $V = A(1 + m \cos k_1 t)(\sin k_2 t)$
2. FM radio wave: $V = A \sin(k_1 t + m \sin k_2 t)$
3. Damped vibration: $A = A_o e^{-k_1 t} \cos k_2 t$ In high school algebra courses students typically deal almost exclusively with polynomials, spending much time on the linear function, y=mx+b, and later the quadratic function $y=ax^2+bx+c$. Higher order polynomials are sometimes introduced after becoming familiar with the first and second order ones in detail. Exponentials and trigonometric functions are becoming more common in pre-calculus algebra courses, and are a significant part of the standard college calculus sequence.

In algebra and pre-calculus courses graphs are emphasized as the best way for students to get a "feel" for the basic functions. They are taught to correlate the various functions with their graphs: they first learn the general shape of the graph of each function type, then they learn how each coefficient specifically affects the shape. For example y=mx+b is always a straight line, m is the slope of the line, and b is the y-axis intercept. Similarly $ax^2+bx+c$ is always a parabola, with the coefficients a, b and c each having specific influences on the appearance of the parabola.

In considering the prior art the most practical method of implementing the teaching system under consideration here is by means of an analog computer system together with an oscilloscope display. The use of an analog computer for solving differential equations or for simulation, with the solution displayed repetitively on an oscilloscope screen, is a commonly used technique. However standard analog computers, while well-suited to these two types of tasks, not suitable for the purpose of function generation in an educational setting. This is primarily a result of the requirement that the only programming necessary should be selecting the function type and setting coefficient values (as well as selecting between various optional features, if such choices exist).

To illustrate the problem involved, consider the analog computer implementation of the simple exponential function $y=Ae^{kx}$. In an analog computer each integrator is given an initial value before computation. Normally the desired initial value is entered by setting a potentiometer (one for each integrator), and when the computer is placed in Reset mode, this value appears at the output of the integrator. In this example, as indicated in the diagrams, the integrator must be initialized to the initial function value $Ae^{kx_o}$, that is, to the value at $x=x_o$. If $x_o$ is not zero, this number will be different for different functions (i.e. different values of A or k), and must be computed manually for each function before the initial condition can be set.

The same problem exists for other function types, and the fact that the computation must be done each time a coefficient is changed makes standard analog computers unusable for the educational purpose under consideration here.

A secondary problem is that standard analog computers are not constructed so that the potentiometer settings are easily visible from a distance.

The system could be built, in principle, with an "on-line" digital computer, but the cost and complexity of this approach would vastly exceed that of the analog computer approach.

SUMMARY OF THE INVENTION

Students generally become familiar with different functions by learning the graph associated with each one, and this is usually done by plotting the graph on paper. A new graph must be plotted for each new coefficient value. Considerable time and effort may be required to plot enough graphs so that the general effect a particular coefficient has may be realized.

It is an object of the present invention to provide a display system which displays "instantaneous" graphs of the commonly taught functions for educational use.

It is an object of the invention to provide a control panel which permits selection of the desired function, with coefficient values continuously variable (i.e. variable without gaps) over certain ranges; and with the following operational features: when a function is selected on the control panel the graph instantly appears on a display screen, and when any coefficient is varied the effect is seen immediately.

It is a further object of the invention to provide instant feedback of the appearance of a function's graph, and of the effect each coefficient in the function has on the graph. The invention is intended as a supplement to manual graph plotting rather than as a complete replacement. Its value lies in the fact that the ability to vary coefficients freely and receive instant feedback is a powerful learning tool.

It is also an object of the invention to have the capability of displaying the derivative graph or integral graph of a function. Such a feature enables calculus students to more quickly learn the concepts of derivative and integral.

Further objects of the invention are to be educationally valuable and useful, and thereby to incorporate the following features and capabilities:

1. To display the function types that are commonly taught in secondary school and beginning college mathematics courses;
2. To respond immediately to the panel controls;
3. To have coefficient values that are continuously variable within ranges that are sufficiently wide to cause a significant change in the shape of the displayed graph;
4. To have the capability to make each coefficient either positive or negative; or zero;
5. To set x and y limits, which determine the portion of the x-y plane which is displayed, in accordance with the coefficient ranges provided so that meaningful graphs will be displayed;
6. To require no control settings or other programming other than selecting the function type and setting the coefficient values;
7. To provide a control panel arranged and labeled in such a way that the significance and use of the various controls (except those that pertain to calculus features, if any) are clear to a person familiar with basic algebra;
8. To provide a display that is bright enough to be easily visible;
9. To provide a displayed graph that is accurate to within 5% at all points.

Further objects of the invention are to incorporate additional features which enhance its power and flexibility. Some examples of this type of feature are:

1. The ability of display derivative or integral graphs simultaneously, but not overlapped, with the original function.
2. The power to generate a function which is a simple combination of basic functions; i.e. a sum or product of basic functions, such as $$A \sin k_1 t + B \cos k_2 t \quad (a)$$

$$A(\sin k_1 t)(\sin k_2 t) \quad (b)$$

$$Ae^{-kt} \sin k_2 t; \quad (c)$$

3. The power to generate composite functions; that is, a function which contains another function in its argument, such as $$A \sin (x^2) \quad (a)$$

$$A \sin (B \cos x); \quad (b)$$

4. Choice of more than one x range; that is, more than one set of upper and lower limits on x; an example of a possible set of x ranges: $-5$ to $+5$, $-10$ to $+10$, 0 to $+10$;
5. Choice of more than one y range.
6. A control panel and display screen which are large enough to be suitable for use in front of a classroom;
7. For projecting the display onto a large screen or wall.

These and other objects are achieved by providing an apparatus having at least one integrator. The integrator provides a voltage output in response to a reset control signal and a forward/reverse signal, each of which signals have high and low logic levels, as well as a reset value signal and a voltage input signal. The voltage output of the integrator is the sum of two items: first, a voltage constant that is capable of being established at the time the reset control signal is high, and which voltage constant is linearly related to the reset value signal; second, a constant c times the integral of the voltage input signal over the time beginning immediately after the reset control signal has returned to a low logic level after being at a high logic level. In a preferred embodiment of the invention, a number of these integrators are placed in tandem, and limit sensors are provided to sense when signals representative of the display are outside the display limits of the system; the limit sensors are connected to cause appropriately modification of signals going to the integrators whenever an outside limit signal is detected.

BRIEF DESCRIPTION OF THE DRAWINGS

These and other objects and features of the invention are more easily understood by reference to the following detailed description taken with the accompanying figures; in which.

DESCRIPTION OF PREFERRED EMBODIMENTS

Figure 1:
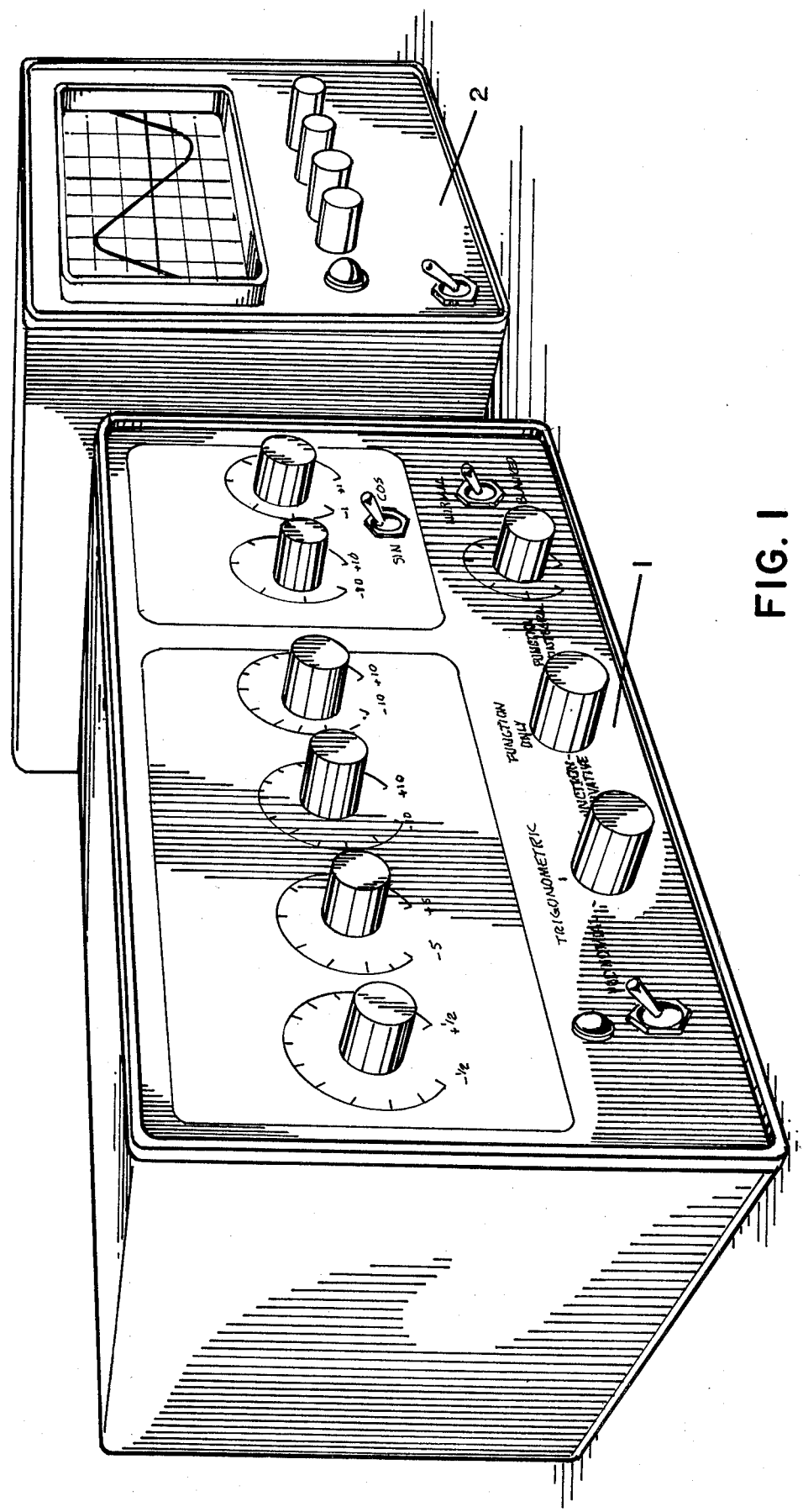
FIG. 1 is a three-dimensional view of a preferred embodiment of the invention.

Referring now to FIG. 1, there is shown a three-dimensional view of an educational system designed to quickly and efficiently aid students in becoming familiar with the elementary mathematical functions and their graphs. Reference character 1 is a cabinet containing a front control panel, and containing in its interior electronics for function generation and power supply electronics. Display unit 2 is a special-purpose oscilloscope which presents on its screen a trace representing the graph of the function generated by unit 1. The two units are interconnected by means of a four-wire cable, each end of which connects to one of the units by means of a four-contact connector, to permit separation of the two units. Each of the two units also contains a two-conductor cord and standard ac plug for obtaining ac power.

Figure 2:
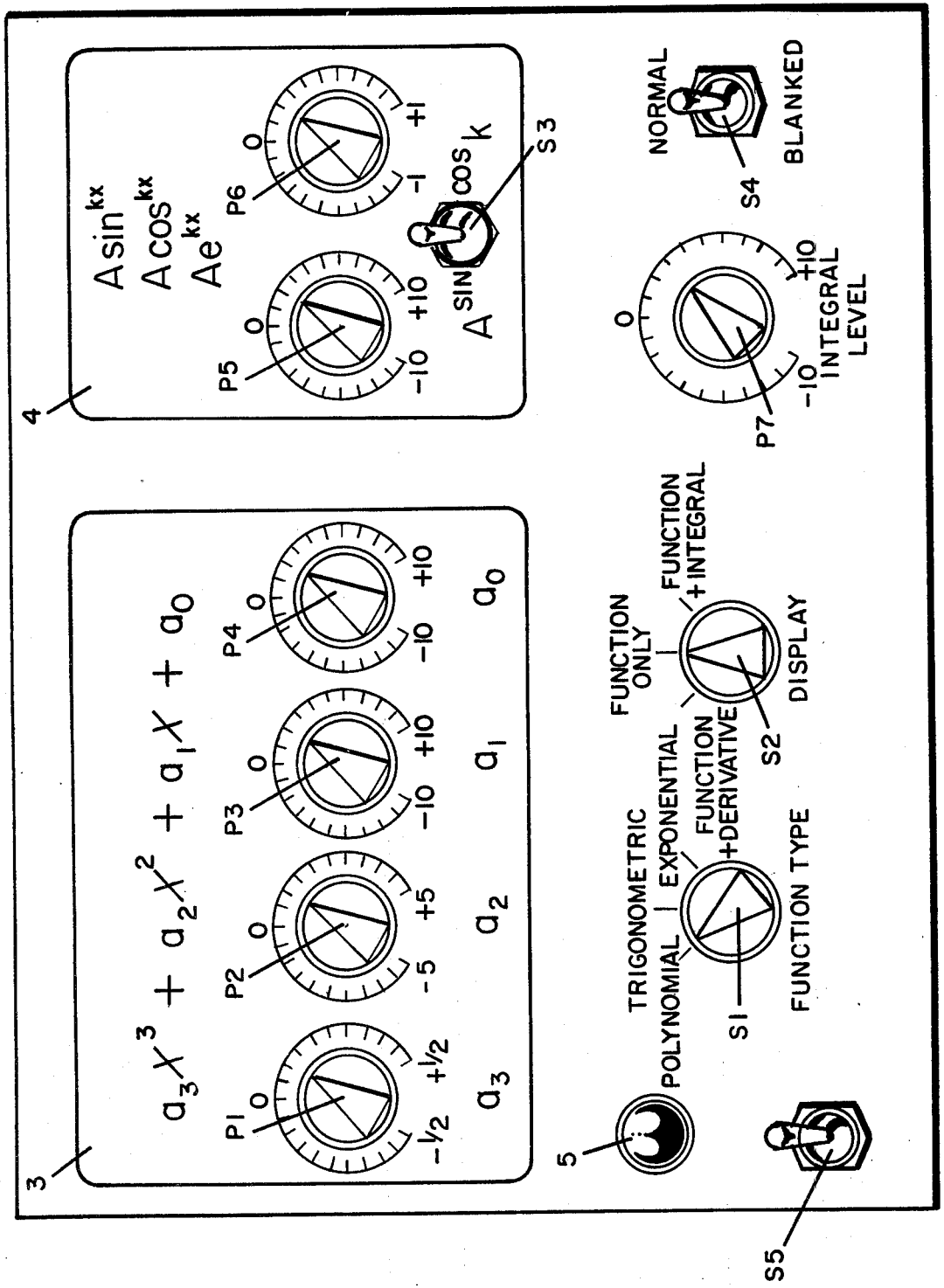
FIG. 2 is a front view of a preferred embodiment of the invention.

FIG. 2 is a front view of a unit 1 control panel, on which is shown a power on/off switch S5, power indicator light 5, function type selector switch S1, display mode selector switch S2, integral level potentiometer and dial P7, derivative/integral blanking switch S4, polynomial control area 3, trigonometric/exponential control area 4, coefficient potentiometers and dials P1, P2, P3, P4, P5 and P6, and sine/cosine selector switch S3.

Figure 3:
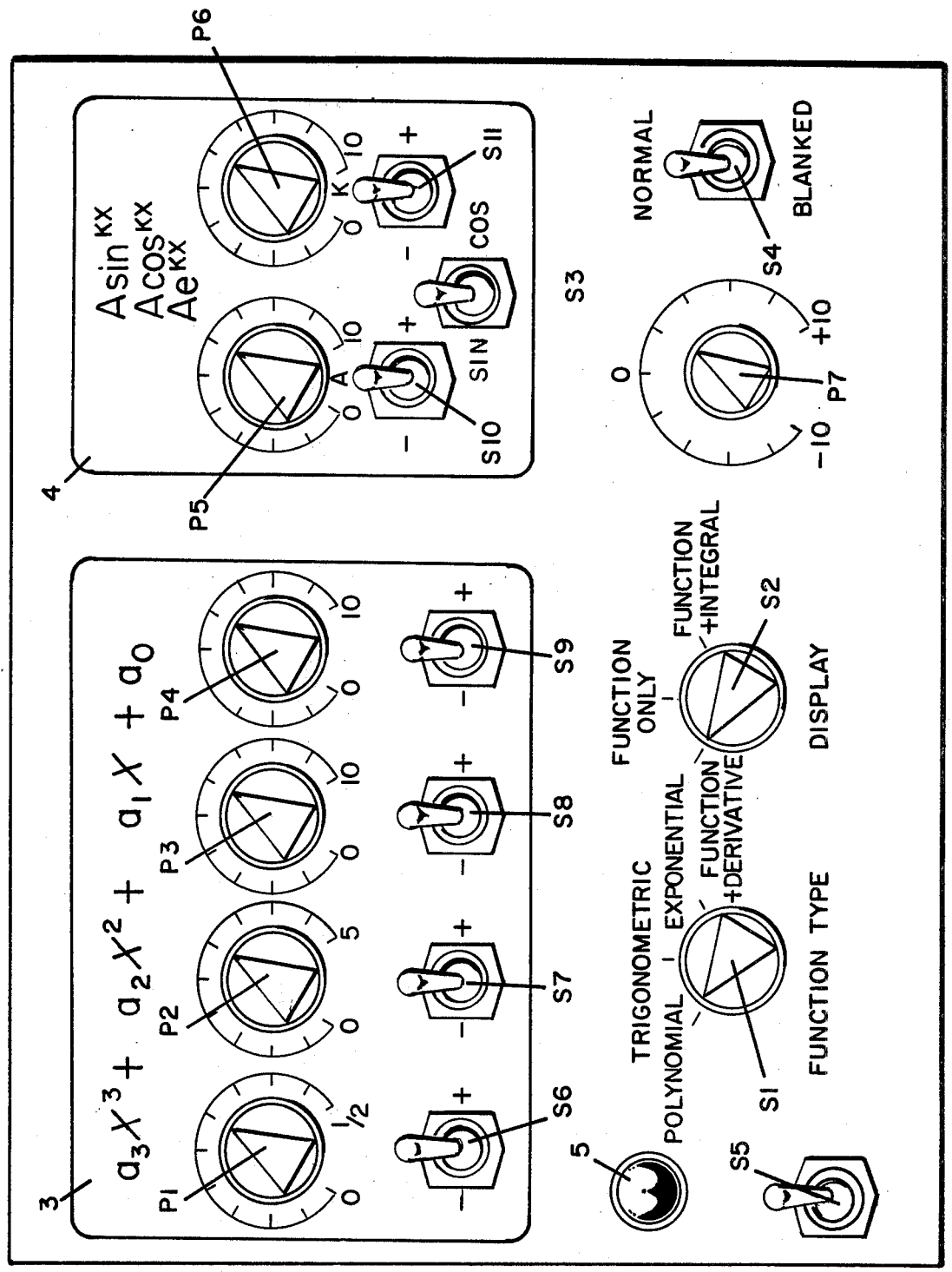
FIG. 3 is a front view of another preferred embodiment of the invention.

FIG. 3 is a front view of an alternate control panel, which contains all those control shown in FIG. 2, with the same labels, and in addition coefficient polarity selector toggle switches S6, S7, S8, S9, S10 and S11.

A typical operation of the control panel of FIG. 3, to display a specific function, is as follows: power the unit by turning S3 "on", select the function type with rotary switch S1, select the display mode desired with rotary switch S2, set function coefficient values with potentiometers P1 through P6 and coefficient polarities with switches S6 through S11. In addition if switch S1 is set to "Trigonometric", then toggle switch S10 is used to select whether the sine or cosine function will be displayed. If switch S2 is set to "Function+Integral", potentiometer P7 permits setting the initial value of the integral graph. If S2 is set to either "Function+Derivative" or "Function+Integral", switch S4 may be used to remove the derivative or integral graph from the display, leaving only the original function graph in the upper half of the screen.

The function generation capabilities of this embodiment are as follows:
1. Function types.
    (a) 3rd degree or lower polynomials: $a_3x^3 + a_2x^2 + a_1x + a_0$
    (b) trigonometric: $A \sin kx$ and $A \cos kx$
    (c) exponential: $Ae^{kx}$
2. Coefficient ranges. The coefficients in the functions identified above are continuously variable within the following limits:

| coefficient | range |
|---|---|
| $a_0$ | $-10$ to $+10$ |
| $a_1$ | $-10$ to $+10$ |
| $a_2$ | $-5$ to $+5$ |

-continued

| coefficient | range |
|---|---|
| $a_3$ | $-\frac{1}{2}$ to $+\frac{1}{2}$ |
| A | $-10$ to $+10$ |
| k | $-1$ to $+1$ |

3. Display modes:
    (a) the function only.
    (b) the function displayed in the upper half of the screen and the derivative graph below it in the lower half of the screen.
    (c) the function displayed in the upper half of the screen and the integral graph below it in the lower half of the screen. The integral level, or "constant of integration", is continuously selectable between $-10$ and $+10$.

In options (b) and (c) above the lower graph may be removed ("blanked") with a panel switch, for educational purposes.

In the particular embodiment, the portion of the selected graph that is displayed on the screen is that portion which lies between the limits $x = -5$, $y = -10$, $x = +5$, $y = +10$.

Figure 4:
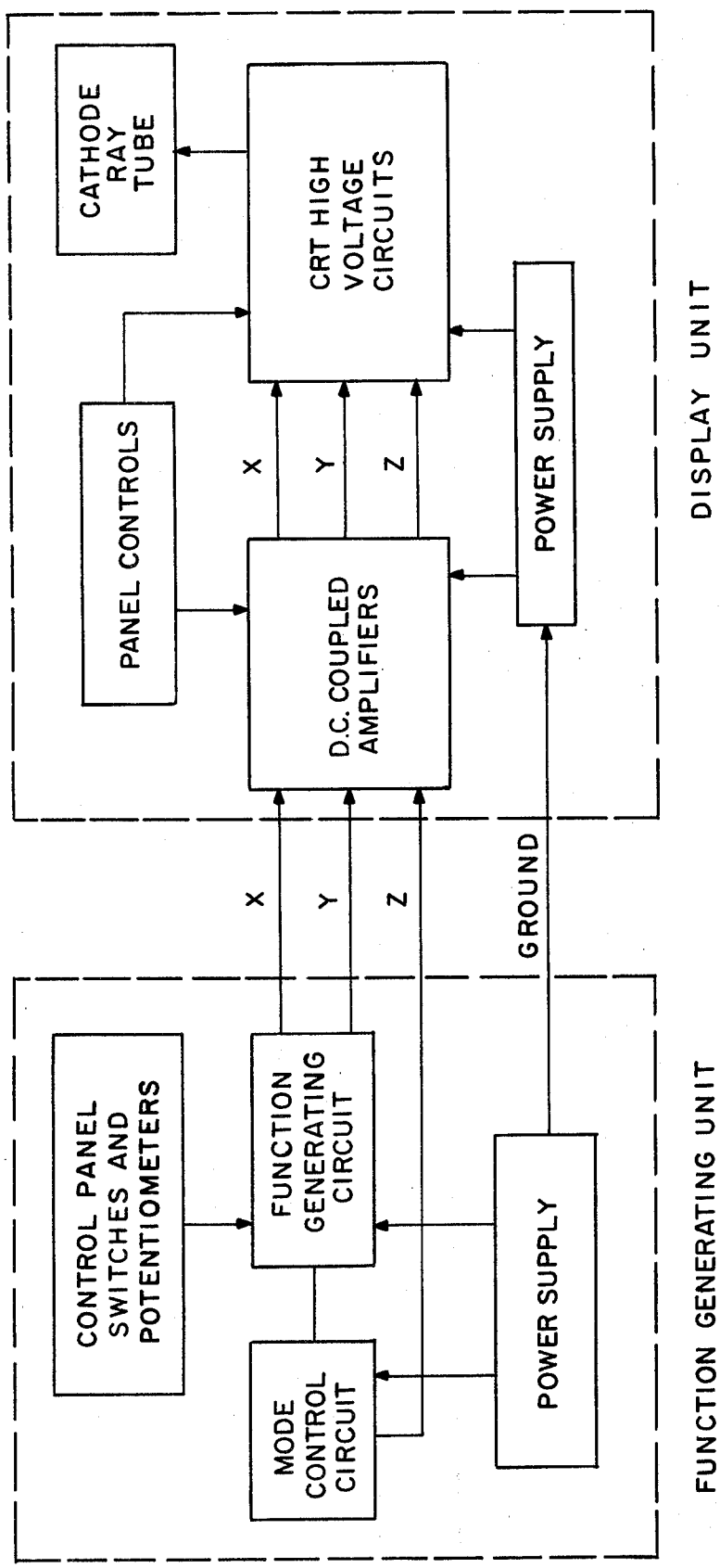
FIG. 4 is a block diagram of the system in accordance with a preferred embodiment of the invention.

FIG. 4 is a system block diagram, showing the paths of information flow among the various sections of the complete system. In this diagram "x" is the horizontal signal to the display screen, "y" is the vertical signal to the screen, and "z" is the trace blanking signal, which modulates the intensity of the display trace.

Figure 5:
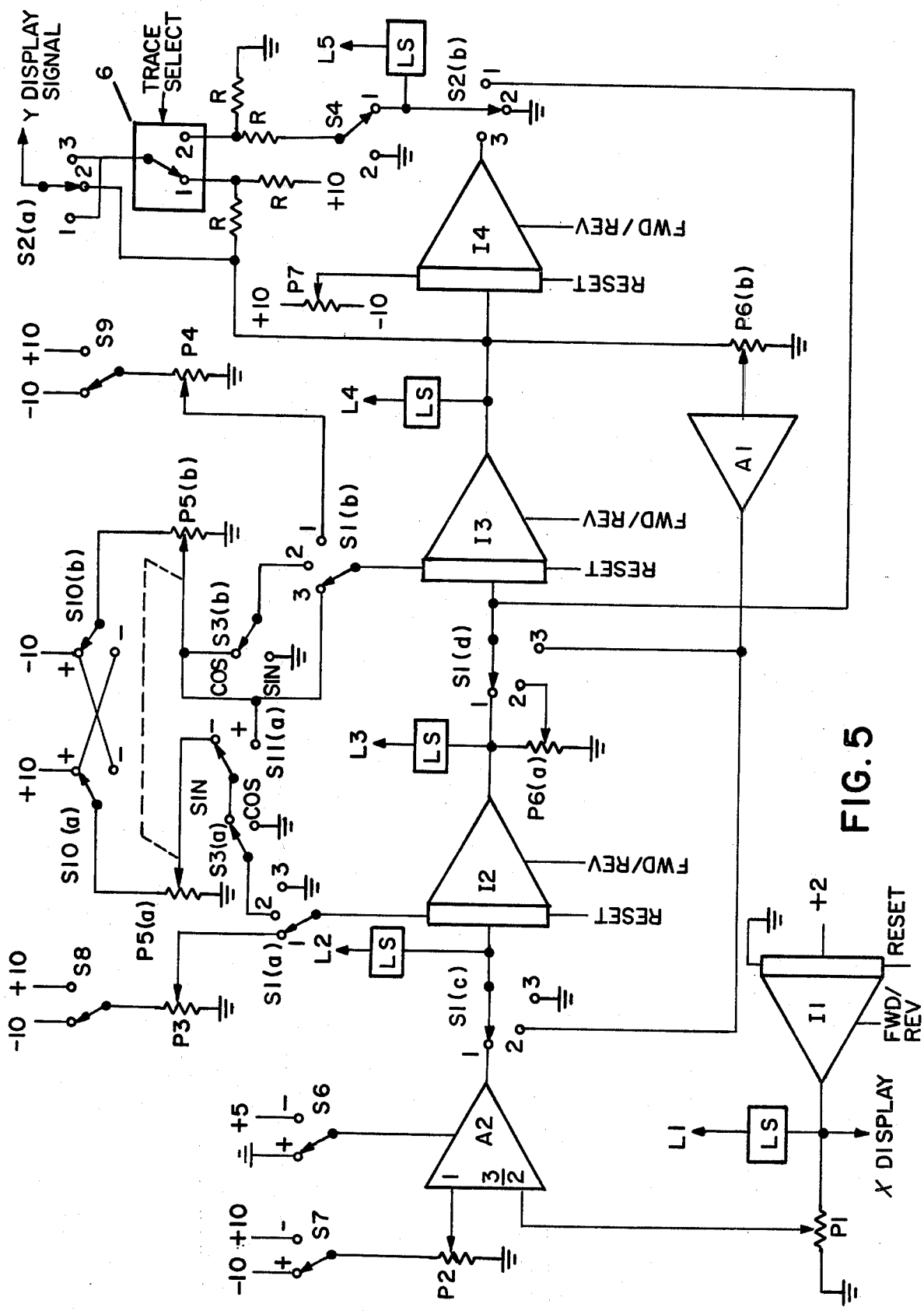
FIG. 5 is a circuit diagram for the invention shown in FIG. 3.
Figure 6A:
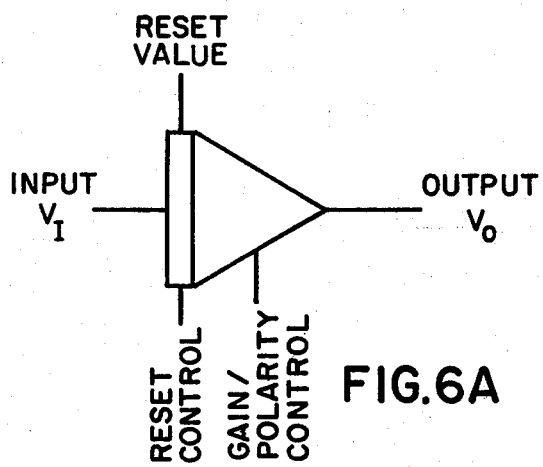
FIG. 6 illustrates certain symbols used in FIG. 5.
Figure 6B:
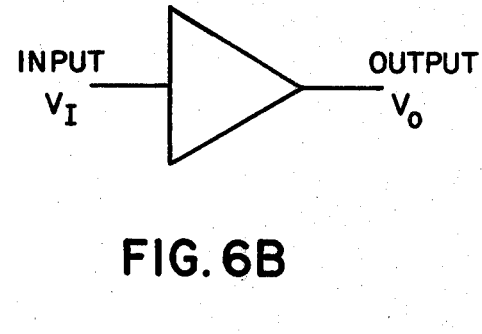

FIG. 5 is a circuit diagram of the function generator circuit, designed to be used in conjunction with the control panel of FIG. 3. FIG. 6 illustrates separately the symbols used in FIG. 5 and subsequent drawings, with the exception of standard symbols for switches and discrete components. Referring for a moment to FIG. 6 prior to a detailed discussion of FIG. 5, the symbol in FIG. 6A represents an integrator with a gain/polarity control, and which operates functionally as follows:

1. When the Reset Control is placed at a standard high logic level (nominally +5 volts), the output voltage becomes equal to the reset value voltage, but with opposite polarity, after a certain time duration.
2. With the Reset Control at a standard low logic level (zero volts) the integrator operates according to the equations $$V_o = (V_o)_{t=0} + A \int V_I dt \qquad (a)$$

with gain/polarity control at a low logic level $$V_o = (V_o)_{t=0} - 2A \int V_I dt \qquad (b)$$

with gain/polarity control at a high logic level, where $V_o$ is the output voltage, $V_I$ is the input voltage, $(V_o)_{t=0}$ is the output voltage at $t=0$, t is the time elapsed since the Reset Control signal has moved from high level to low level, and A is the positive gain factor of the integrator. A typical value for A is 1000.

Figure 6C:
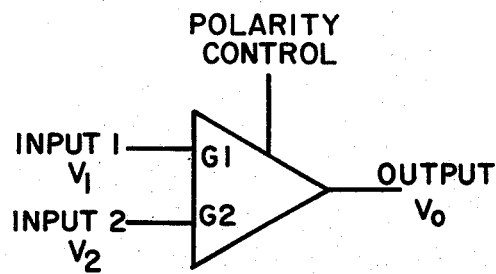

An equivalent definition consists of the equations $$(dV_o/dt) = AV_I \qquad (a)$$

with gain/polarity control at a low logic level $$(dV_o/dt) = -2AV_I \qquad (b)$$

with gain/polarity control at a high logic level.

analog inverter, which represents a standard analog inverter, which operates according to the equation $V_o = -V_I$, where $V_o$ is the output voltage and $V_I$ is the input voltage. The symbol in FIG. 6C represents a special analog summer with polarity control and which operates according to the equations $$V_o = G_2 V_2 - G_1 V_1$$

with polarity control at a standard low logic level $$V_o = -G_2 V_2 - G_1 V_1$$

with polarity control at a standard high logic level, where $V_o$ is the output voltage, $V_1$ is the input 1 voltage, $V_2$ is the input 2 voltage, and $G_1$ and $G_2$ are the input 1 and input 2 gain factors, respectively.

Figure 6D:
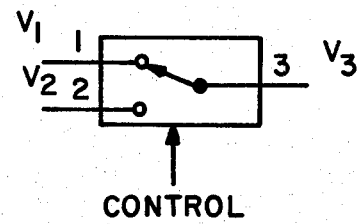

FIG. 6D represents an electronically controlled analog switch, which is similar to a relay functionally, but with the feature that very fast switching times are possible. Let $V_1$, $V_2$ and $V_3$ be the voltages at terminals 1, 2 and 3, respectively, then the operation is as follows: $V_3 = V_1$ when the control input is at a standard high logic level; $V_3 = V_2$ when the control input is at a standard low logic level. Texas Instruments No. TL188 and Signetics No. DG188 are switches of this type.

Figure 6E:
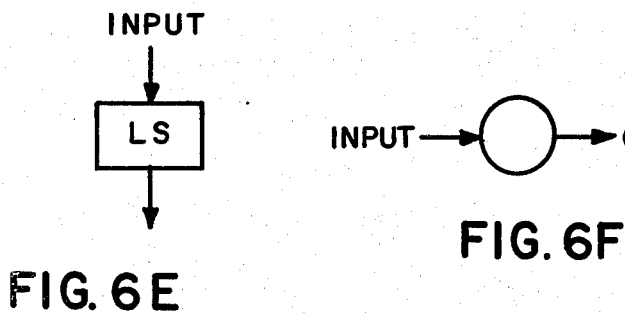

The symbol of FIG. 6E represents a Limit Sensor which operates as follows: the output is at +5 volts whenever the input voltage lies between −10 and +10 volts; and the output is at −15 volts whenever the input voltage is outside of the range −10 voltage to +10 volts.

Figure 6F:
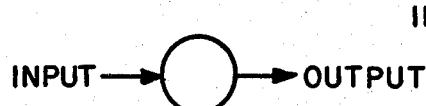
Figure 6G:
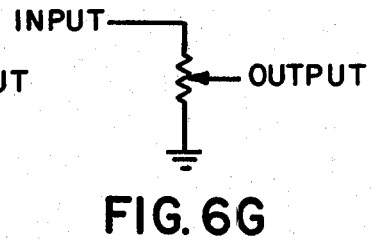

FIG. 6G shows a variable voltage divider, or potentiometer, and FIG. 6F is the standard analog computer symbol for such a potentiometer. The output of a potentiometer is always equal to the input voltage multiplied by a specific fraction less than or equal to unity. In FIG. 6F such fraction, referred to as the potentiometer setting, may be indicated by a value inside the circle.

Also in FIG. 5, +10 and −10 represent the "reference" or "limit" voltages +10 volts and −10 volts respectively. A typical value for the resistances R is 22kΩ.

Figure 7A:
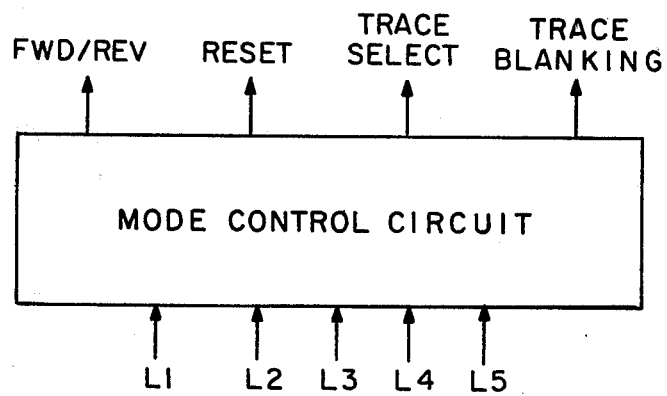
FIG. 7 presents a block diagram of a mode control circuit in accordance with the embodiment shown in FIG. 3.
FIG. 7B, typical waveforms thereof.
Figure 7B:
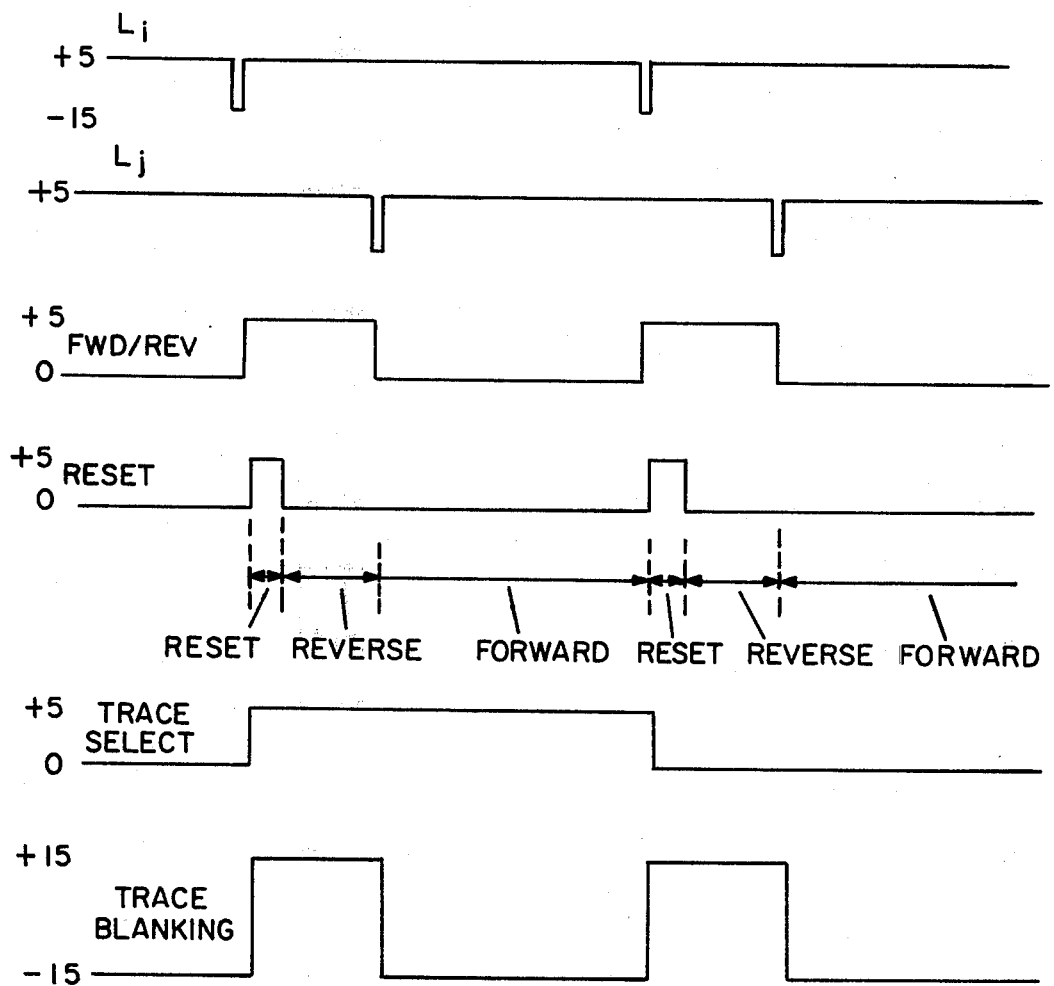

The control signals labeled FWD/REV, RESET, and TRACE SELECT are created by the mode control circuit, shown in FIG. 7A as a block with input and output signals. FIG. 7B presents typical waveforms of these signals, which are digital in nature. In FIG. 7B $L_i$ and $L_j$ represent any two of the limit sensor signals $L_1$, $L_2$, $L_3$, $L_4$ and $L_5$. Computer operation is divided into three segments, referred to as Reset, Reverse, and Forward modes, which occur repetitively in that order. The signals labeled FWD/REV and RESET control the timing of these modes, or segment: Reset occurs when the RESET signal is high; Reverse occurs when FWD/REV is high and RESET is low, Forward occurs when FWD/REV is low. When FWD/REV is low, the occurrence of any $L_i$ causes FWD/REV and RESET to go high; if FWD/REV is high, an $L_i$ signal causes FWD/REV to go low. RESET remains high for a fixed time duration which is long enough to allow all integrator outputs to reach equilibrium (steady state); this time depends on the internal circuitry of the integrators.

TRACE SELECT alternates between high and low, the transitions occurring each time RESET and FWD/REV go high. TRACE BLANKING follows the same timing as FWD/REV, but its two voltage states are +15v. and −15v., corresponding to the high and low states, respectively, of FWD/REV. TRACE BLANKING causes the display trace to be blanked out whenever it is at +15v., so that the trace appears only during Forward.

It will be demonstrated that the state of the system at the end of Reverse represents the left end point of the desired graph, and that the computer generates the desired graph during Forward.

$x_r$ will denote the

-continued

Forward:

$$V_2 = V_o + A\int V_1 dt = V_o + A\int V_1 \frac{dx_f}{A} = V_o + \int V_1 dx_f$$

$$\frac{dV_2}{dx} = \frac{dV_2}{dx_f} = \frac{dV_2}{dt}\frac{dt}{dx} = (AV_1)\left(\frac{1}{A}\right) = V_1.$$

In the Forward case $x_f$ must be used instead of x in the integral equation because the indefinite integral $\int V_1 dt$ does not contain any constant component.

Amplitude scaling at all points in the analog circuit is unity: one volt is equivalent to one numerical unit.

Referring again to FIG. 5: the circuit components generate a function type which is determined by the setting, or position, of switch S1. The desired function, y, always appears at the I3 output, and I1 always generates 2x. Since the maximum range of the integrator outputs, and hence 2x, is $-10$ to $+10$, the maximum range of x is $-5$ to $+5$.

Figure 8:
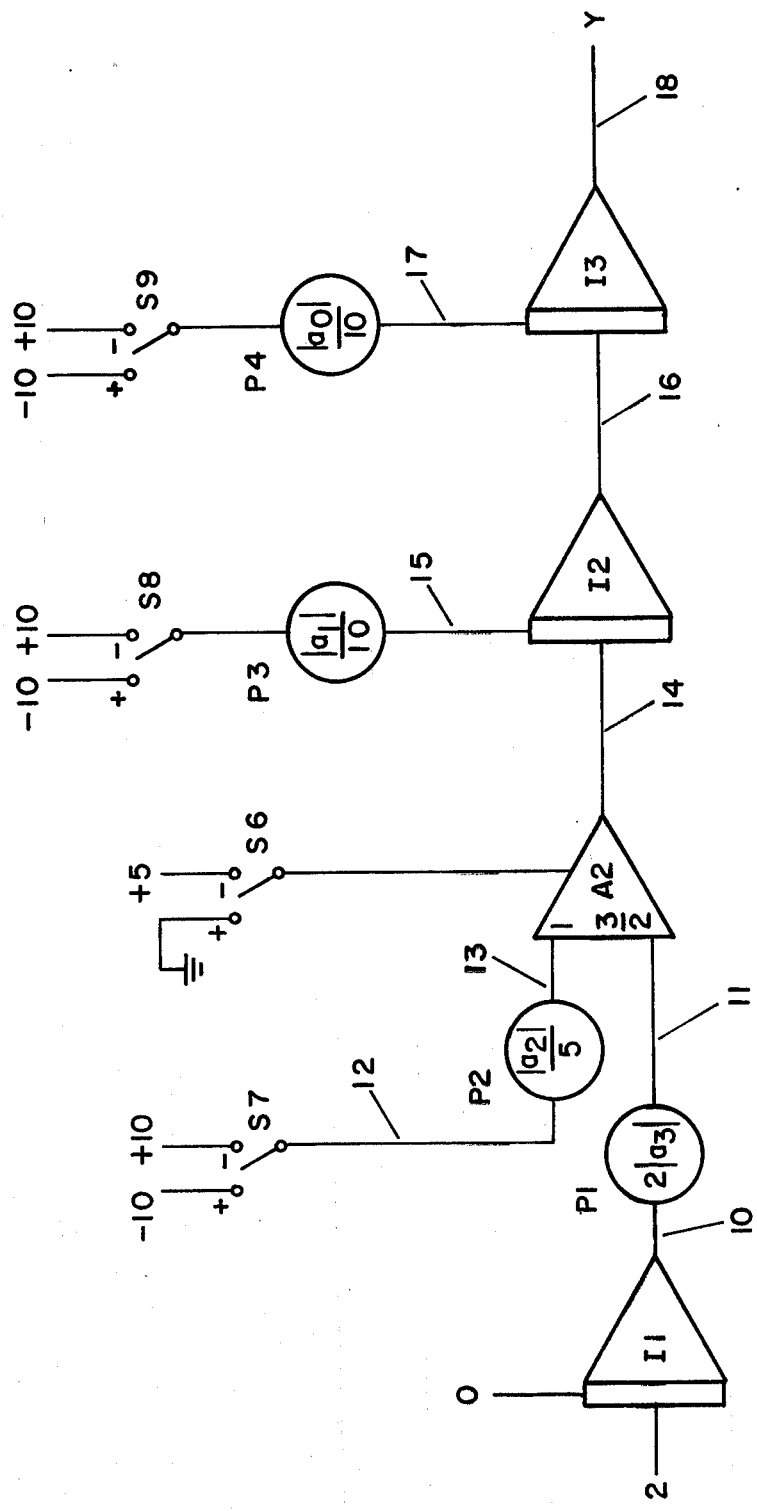
FIG. 8 is a simplified schematic of that in FIG. 5 for description of the operation of the invention.

When switch S1 is in position 1 (Polynomial), integrators I1, I2, I3 and summer A2 are interconnected as shown in FIG. 8. The signals at the inputs and outputs of these components in Reverse mode are listed in Table 1; here and subsequently y' represents dy/dx and y" represents $d^2y/dx^2$, and $|a_3|$ denotes the absolute value of $a_3$.

Table 1

| Wire | Signal |
|---|---|
| 18 | y |
| 17 | $-a_o$ |
| 16 | y' |
| 15 | $-a_1$ |
| 14 | y" |
| 13 | $-2a_2$ |
| 10 | $2x_r$ |
| 11 | $4|a_3|x_r$ |

To justify the signals given in Table 1 for wires 13, 15 and 17, it is noted first that if $a_o$ is positive (S9 on "+"), the voltage on wire 17 is $(-10)(a_o/10) = -a_o$; if $a_o$ is negative, the voltage on wire 17 is $(+10)(|a_o|/10) = (10)(-a_o/10) = -a_o$ again. Similarly the voltage on the wire 15 is always $-a_1$, and the voltage on wire 13 is always $-2a_2$, where $a_1$ and $a_2$ may be positive or negative, or zero.

If $a_3$ is positive, A2 output in Reverse is $(3/2)(4a_3x_r) - (-2a_2) = 6a_3x_r + 2a_2$; if $a_3$ is negative, A2 output is $(-3/2)(4|a_3|x_r) - (-2a_2) = (-3/2)(4)(-a_3)x_r + 2a_2 = 6a_3x_r + 2a_2$ again, hence this expression holds for both cases, and for $a_3 = 0$. Since A2 output is also y", the equation $$y'' = 6a_3x_r + 2a_2$$

holds, and this is a differential equation defining the behavior of the circuit. The general solution to this equation is:

$$y = c_3x_r^3 + c_2x_r^2 + c_1x_r + C_o$$

and the constants $c_o$, $c_1$, $c_2$ and $c_3$ are determined by the initial values of y, y' and y" at $x_r = 0$: $c_0 = y(0)$, $c_1 = y'(0)$, $c_2 = \frac{1}{2}y''(0) = \frac{1}{2}(2a_2) = a_2$, and $c_3 = a_3$. (That this is the solution may be verified by differentiation.) Since the initial values of Reverse are the values at the end of Reset, it follows that $c_o = a_o$, and $c_1 = a_1$. Thus, for Reverse, $$y = a_3x_r^3 + a_2x_r^2 + a_1x_r + a_o,$$

$$y' = 3a_3x_r^2 + 2a_2x_r + a_1,$$

and $y'' = 6a_3x_r + 2a_2$

TABLE 2

|  | Reverse | Forward |
|---|---|---|
| $c_0$ | $a_0$ | $a_3x_0^3 + a_2x_0^2 + a_1x_0 + a_0$ |
| $c_1$ | $a_1$ | $3a_3x_0^2 + 2a_2x_0 + a_1$ |
| $c_2$ | $a_2$ | $3a_3x_0 + a_2$ |
| $c_3$ | $a_3$ | $a_3$ |

Now during Forward the signals in the current are as listed in Table 1 except that $x_r$ is replaced by x, i.e. by $x_o + x_f$. Accordingly the circuit equation (at wire 14) is $y'' = 6a_3x + 2a_2$ $$y'' = 6a_3x_f + 6a_3x_o + 2a_2$$

A solution to this equation is $$y = (3x_f^3) + (2x_f^2) + c_1x_f + c_0$$

where the coefficients are determined by the conditions at the start of Forward ($x_f = 0$); namely $c_0 = y(0)$, $c_1 = y'(0)$, $c_2 = \frac{1}{2}y''(0)$ and $c_3 = a_3$. That this is a solution may be verified by differentiation. Since the conditions at $x_f = 0$ are the conditions at the end of Reverse, the values of $c_0$, $c_1$, and $c_2$ are found by substituting $x_0$ for $x_r$ in the expressions for y, y' and y" for Reverse, given above. These values are listed in Table 2 under FORWARD.

Thus the function generated at the I3 output during Forward is $$y = a_3x_f^3 + (6a_3x_o + 2a_2)x_f^2$$
$$+ (3a_3x_o^2 + 2a_2x_o + a_1)x_f + (a_3x_o^3 + a_2x_o^2 + a_1x_o + a_o)$$

$$= (a_3x_f^3 + 3a_3x_ox_f^2 + 3a_3x_o^2x_f + a_3x_o^3)$$
$$+ (a_2x_f^2 + 2a_2x_ox_f + a_2x_o^2) + (a_1x_o + a_1x_f) + a_o$$

$$= a_3(x_o + x_f)^3 + a_2(x_o + x_f)^2 + a_1(x_o + x_f) + a_o$$

or $y = a_3x^3 + a_2x^2 + a_1x + a_o$.

Figure 9:
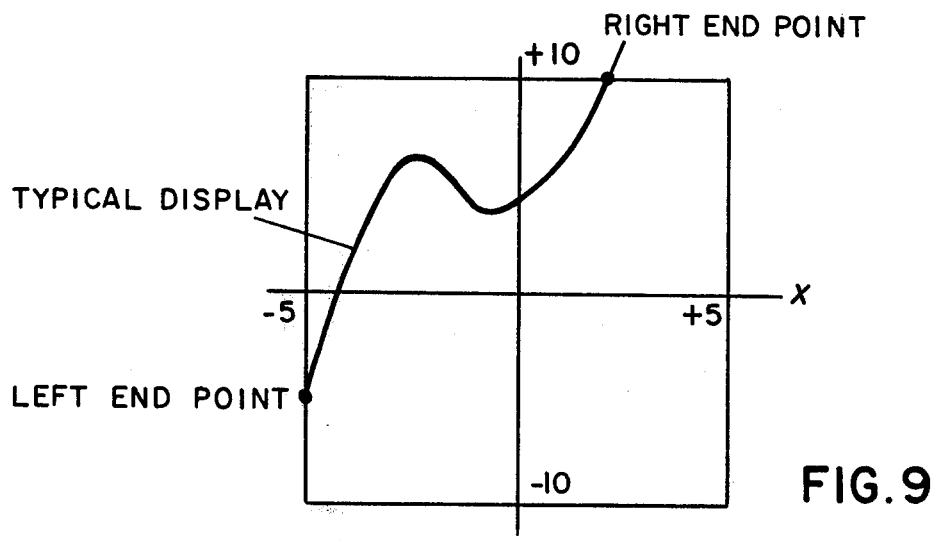
FIG. 9 shows a function displayed as a result of the schematic of FIG. 8.

With the polynomial connection of FIG. 8 it is generally the case that of all the signals involved, those with the largest amplitude are the I1 output and the I3 output, and therefore as a general rule the Reverse segment ends when one of these two signals reaches $+10$ or $-10$. This fact may be interpreted as meaning that generally the left end point of the graph lies on the boundary of the left-hand portion of the display region, which is illustrated in FIG. 9. If I1 limits first, then $x_0 = -5$ and the left end point is on the $x = -5$ line. If I3 limits first, then $x_o > -5$ and the left end point lies on the $y = +10$ or $y = -10$ line.

Similarly the right end point coincides with the end of the Forward time segment and generally the right end point of the graph lies on the boundary of the right-hand half of the display region, for the same regions mentioned in connection with the left end point.

The system in this manner automatically computes the end points of the graph, and it is not necessary for the operator to manually select or compute $x_o$ or $Y(x_o)$.

Since only the Forward computation is displayed, the display trace intensity is weakened in proportion to the fraction of the time that the trace is blanked out. Normally the duration of Reset is small compared to that of Reverse and Forward. Now during Reverse x ranges from 0 to −5; during Forward x ranges from −5 to +5, if the end points lie at x=−5 and x=+5. However the time rate of change of x during Reverse is twice as fast as it is during Forward, thus the time duration of Reverse is only approximately one-fourth that of Forward, so that the trace intensity is weakened only approximately 25%. In the embodiment under discussion the ratio of the Reverse time scale factor to the Forward time scale factor is two, however it is understood that the ratio is not limited to this value. A different ratio would result in a different trace intensity reduction.

Figure 10:
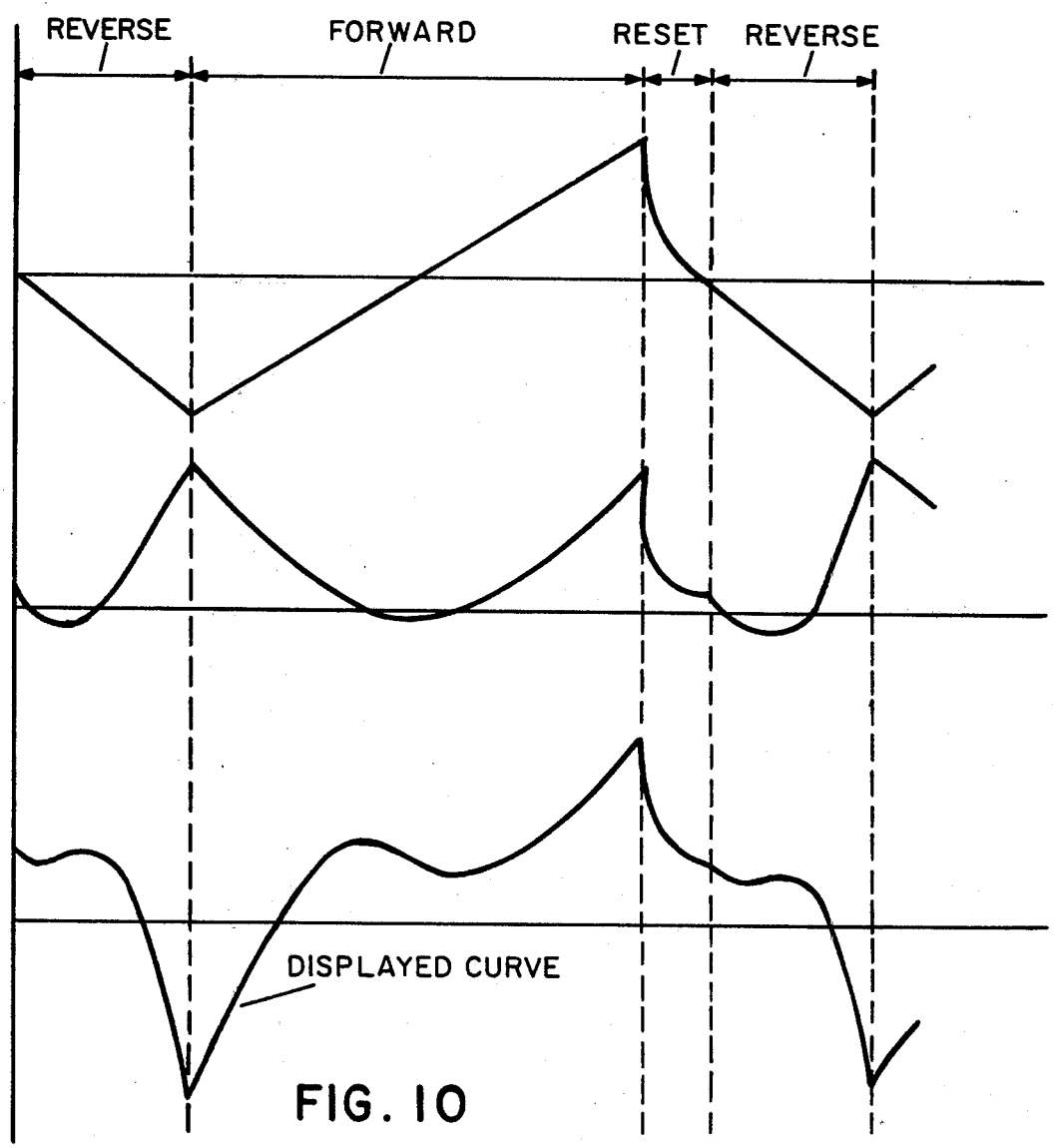
FIG. 10 illustrates a typical set of waveforms for a polynomial function displayed in accordance with the invention embodiment of FIG. 3.

FIG. 10 illustrates a typical set of waveforms for a polynomial function.

Figure 11:
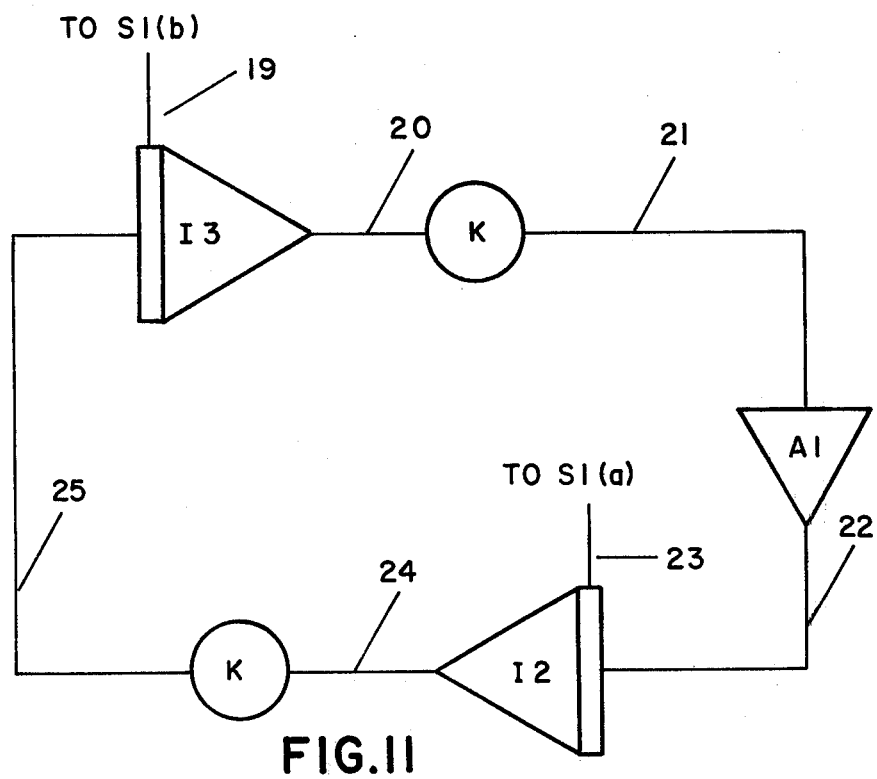
FIGS. 11 and 12 are simplified schematics of those in FIG. 5 for description of the operation of the invention.

Referring again to FIG. 5, when S1 is in position 2 (Trigonometric), integrators I1 and I3 and inverter A1 are interconnected as shown in FIG. 11. In FIG. 11, and subsequently in this discussion, the symbol K represents the absolute value of the coefficient k. Table 3 lists the signals that appear on the various wires in the circuit of FIG. 11.

Table 3

| Wire | Signal |
|---|---|
| 20 | y |
| 21 | Ky |
| 22 | −Ky |
| 25 | y' |
| 24 | (1/K)y' |
| 22 | $\frac{d}{dx}\left(\frac{1}{K}y'\right) = \frac{1}{K}y''$ |

The signal on wire 22 represents both −Ky and 1/K Y", so that the equation $$-Ky = (1/K)y''$$

or $$y'' = -K^2 y$$

holds. This is the basic differential equation determining the behavior of the circuit, for which the general solution in Reverse mode is $$y = c_1 \sin Kx_r + c_2 \cos Kx_r$$

and the associated expression for y' is $$y = Kc_1 \cos Kx_4 - Kc_2 \sin Kx_r.$$

$C_1$ and $C_2$ are given by:

$$c_2 = y(0) \text{ and } c_1 = 1/K\, y'(0).$$

The positions of switches S3 and S11 determine the I2 and I3 reset values. There are three possible situations since the position of S11 is immaterial when S3 is switched to "cos". Table 4 lists the reset values for each situation, and the corresponding values for $c_1$ and $c_2$ for Reverse mode. Substituting these into the general solution yields the expressions for y and y' during Reverse; then $x_r$ is replaced by $x_o$ to give the initial integrator outputs for Forward mode, and hence $c_1$ and $c_2$ for Forward.

Table 4.

|  | S3 = sin, S11 = + | S3 = sin, S11 = − | S3 = cos |
|---|---|---|---|
| I3 reset value (wire 19) | 0 | 0 | −A |
| y at start of Reverse (wire 20) | 0 | 0 | A |
| $c_2$ for Reverse | 0 | 0 | A |
| I2 reset value (wire 23) | −A | A | 0 |
| 1/K y' at start of Reverse (wire 24) | A | −A | 0 |
| $c_1$ for Reverse | A | −A | 0 |
| y during Reverse | A sin $Kx_r$ | −A sin $Kx_r$ | A cos $Kx_r$ |
| y' during Reverse | KA cos $Kx_r$ | −KA cos $Kx_r$ | −KA sin $Kx_r$ |
| y at end of Reverse = $c_2$ for Forward | A sin $Kx_o$ | −A sin $Kx_o$ | A cos $Kx_o$ |

Figure 12A:
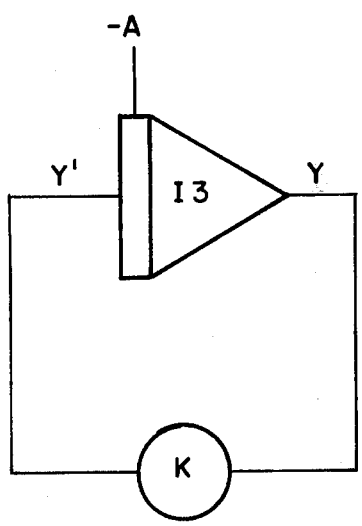
Figure 12B:
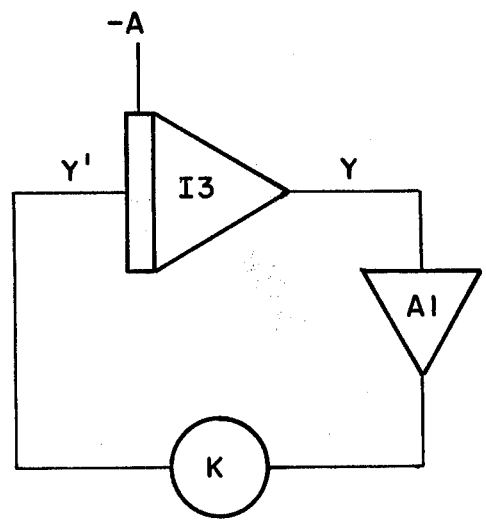

The general solution expressions for Forward are the same as for Reverse, except that $x_r$ is replaced with $x_f$, and y(0) and y'(0) represent the states of y and y' at the start of Forward. The functions generated during Forward may be found by substituting the expressions for $c_1$ and $c_2$ into the general solution:

$S3 = \sin, S11 = +$      (a)
$y = (A \cos Kx_o) \sin Kx_f + (A \sin Kx_o) \cos Kx_f$
$\quad = A \sin (Kx_o + Kx_f) = A \sin K(x_o + x_f)$
$\quad = A \sin Kx = A \sin kx.$ $S3 = \sin, S11 = -$      (b)
$y = (-A \cos Kx_o) \sin Kx_f + (-A \sin Kx_o) \cos Kx_f$
$\quad = -A \sin (Kx_o + Kx_f) = -A \sin Kx$
$\quad = A \sin (-Kx) = A \sin kx.$ $S3 = \cos$      (c)
$y = (-A \sin Kx_o) \sin Kx_f + (A \cos Kx_o) \cos Kx_f$
$\quad = A \cos (Kx_o + Kx_f) = A \cos K(x_o + x_f) = A \cos Kx$
$\quad = A \cos kx.$ When S1 is in position 3 (Exponential), I3 generates y when $k \geq 0$ as shown in FIG. 12A; I3 and A1 generate y when $k \leq 0$ as shown in FIG. 12B. In both cases the I3 output represents y and the I3 input represents y'. Hence for $k \geq 0$ (FIG. 12A) the circuit equation is $$y' = Ky = ky$$

and for $k \leq 0$ (FIG. 12B) the circuit equation is $$y' = -ky = ky$$

so that the differential equation y'=ky applies to both cases. The solution to this equation, for Reverse, is $$y = c_1 e^{kx_r}$$

where $c_1 = y(0) = y$ at $x_r = 0$. From FIG. 5 it is evident that the I3 reset value input is always −A, hence y(0) for Reverse is +A, and $y = Ae^{kx_r}$ during Reverse. Now a solution to the circuit equation for Forward is $$y = c_1 e^{kx_f}$$

where $c_1 = y$ at start of Forward $(x_f = 0) = Ae^{kx_o}$. Therefore during Forward the function generated by I3 is $$y = (Ae^{kx_o})e^{kx_f} = Ae^{kx_o\, = kx_f}$$

or $$y = Ae^{kx}.$$

With Trigonometric and Exponential function types, as was the case with Polynomials, the start of Reverse and the start of Forward occur when an integrator output or summer output reaches $+10$ or $-10$; and generally the end points of the displayed graph lie on the boundary of the display region.

In FIG. 5 the input to integrator I4 is y; as a result during Forward the output of I4 is the integral of y: I4 output $= c + \int y \, dx_f$, where c is the "constant of integration" and is set by the operator, using potentiometer P7. Having c adjustable by the operator accomplishes two purposes: (1) it demonstrates to students that the constant of integration is arbitrary and independent of the original function; (2) the operator often can present the integral graph from limiting (i.e. reaching $+10$ or $-10$) earlier than the original function (y), by shifting the level of the integral graph using P7.

Inasmuch as y always appears at the I3 output, the I3 input signal always represents the derivative dy/dx.

Displaying the original function (y) together with the integral or derivative graph on the same screen requires reducing the amplitudes of these signals by a factor of two, and displaying them in separate portions of the screen. Switch S2(b) selects the integral or the derivative, and with S4 in position 1, this signal is divided by two and shifted down five units by a voltage divider consisting of two equal resistances (R). The divided signal is fed to input 2 of analog switch 6. Similarly y is divided by two and shifted up five units by a resistive voltage divider, and fed to input 1 of analog switch 6. When S2 is in position 1 or 3, the third terminal of analog switch 6 becomes the vertical display signal which is sent to the display unit. The "Trace Select" signal, which controls analog switch 6, thus causes the graph of y and the integral or derivative graph to be alternately displayed, the y graph in the upper half of the screen and the integral or derivative in the lower half.

The integral or derivative graph may be removed separately from the display by switching S4 to "Blanked", which substitutes ground for the integral or derivative.

With switch S2 in position 2 (Function Only), only the y graph is displayed, with no amplitude or level change.

The Power Supply in the Function Generation Unit provides low impedance sources of $+15$ volts and $-15$ volts which power the operational amplifiers; low impedance sources of $+10$ volts and $-10$ volts which serve as the analog computer reference voltages; a low impedance source of $+5$ volts which powers the digital components in the Mode Control circuit, and a medium impedance source of $+2$ volts for the I1 input and elsewhere.

The Display Unit, illustrated in FIG. 1 and shown in block diagram form in FIG. 4, is a special purpose oscilloscope, preferably with a large screen, and with a rectangular coordinate grid placed over the screen; this oscilloscope contains the dc-coupled x, y and z amplifiers, with gain and shift panel controls connected to the x and y channels. The x channel controls the horizontal trace deflection while the y channel governs the vertical deflection. The gain and shift controls are used to center the spot on the screen when no signals are applied, and to adjust the deflection gains such that x and y signal amplitudes correspond to the coordinate grid placed over the screen. The z channel inverts and amplifies a $+15$ volt input signal to a value sufficient to blank out the trace when coupled to the grid of the cathode ray tube.

Alternatively a standard general purpose oscilloscope with a "z", or trace modulation, input may be used. The internal horizontal sweep is not used; instead the external horizontal input is used as the x input.

The subcomponents typically used to construct analog integrators, inverters and summers are:

A. Operational Amplifier

Figure 13A:
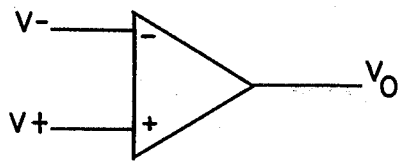
FIGS. 13 through 19 present circuit details of modular units illustrated in FIG. 6.
Figure 13B:
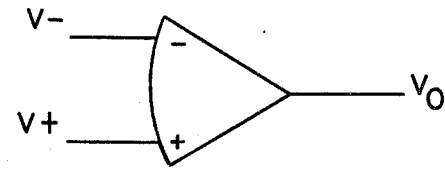

A differential operational amplifier, represented by the symbol of FIG. 13A or the symbol of FIG. 13B, amplifies $(V_+ - V_-)$ by a large factor, or gain, G, which is typically between $10^4$ and $10^6$. The amplified difference appears as $V_o$; however the range of $V_o$ is limited by the levels of the device power supply voltages. If $V_o$ is less than the limiting voltages (in absolute value), then $V_o = G(V_+ - V_-)$, and the amplification is linear. In integrator, summer, and inverter applications there is a feedback path from $V_o$ to $V_-$; this negative feedback attempts to reduce the value of $V_+ - V_-$ and adjust the value of $V_o$ to the point at which $V_o = G(V_+ - V_-)$. If the circuit conditions allow this to happen then the amplifier is operating linearly and $V_+ - V_- = V_o/G$; so that since G is large, $V_+ - V_-$ is close enough to zero that it is impossible to assume $V_+ = V_-$. In the present system the limit sensors ensure that each amplifier is operating in the linear region.

The second principle useful in analyzing operational amplifier circuits is that the currents into the − and + inputs of the operational amplifier are sufficiently small that they may be assumed to be zero.

B. Analog Switch

Figure 14:
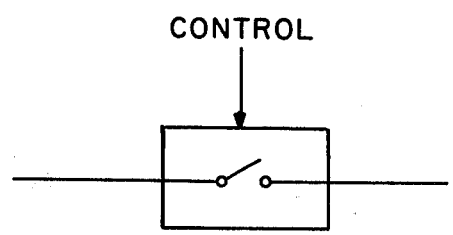

The symbol in FIG. 14 is a general one representing any type of device which acts as a remote controlled switch, such as a relay, or electronic analog switch such as Texas Instruments No. TL185. The control signal assumes either of two states, one of which opens the switch, and the other of which closes the switch. In the subsequent discussion it is assumed that a standard high logic level at the control input closes the switch, and a standard low logic level at the control input opens the switch.

C. Resistors, Capacitors and means to interconnect all components.

Figure 15:
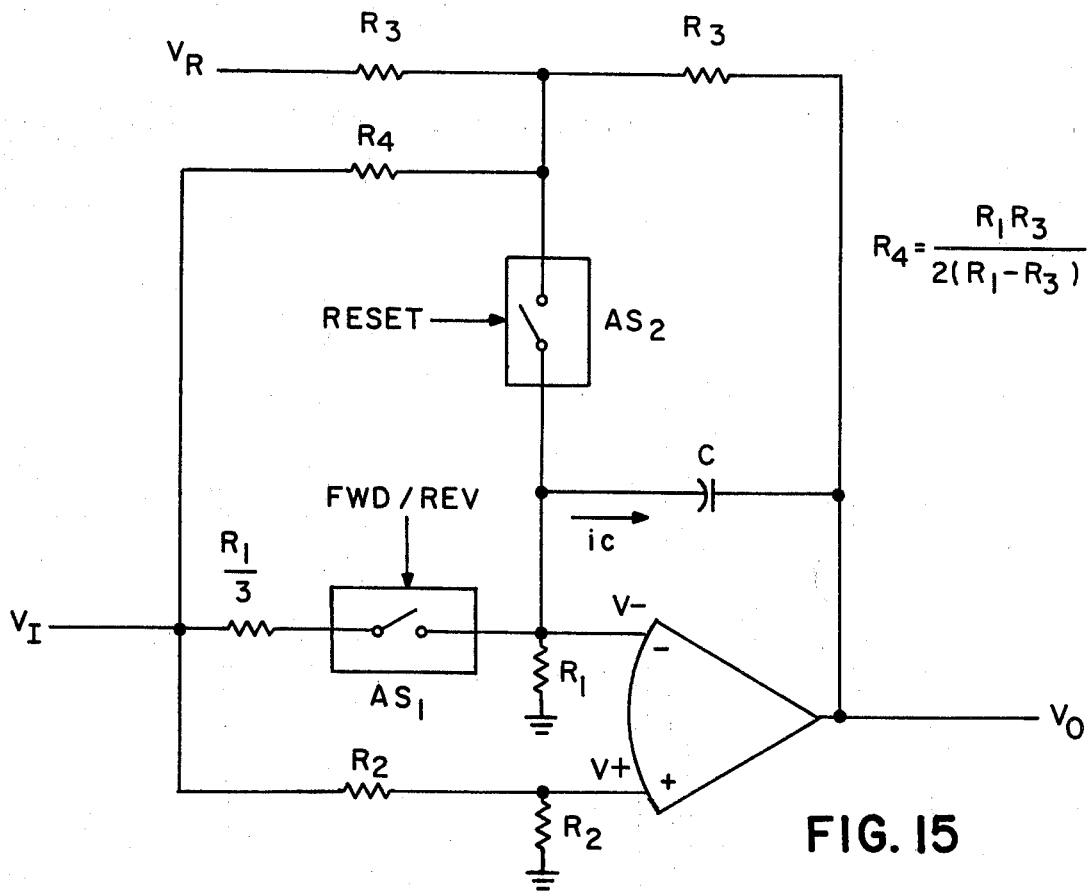

FIG. 15 is an example of an integrator circuit which, consistent with the earlier specific embodiment system, integrates with sign inversion during Reverse and without sign inversion during Forward, and has a Reverse gain factor which is twice the Forward gain factor. An analysis follows:

Reset mode
AS$_1$ closed, AS$_2$ closed $$V_- = V_+ = VI/2$$

Summing currents at the $V_-$ junction gives:

$$\frac{V_R - V_-}{R_3} + \frac{V_I - V_-}{R_4} - \frac{V_- - V_o}{R_3} - \frac{V_-}{R_1} = 0$$

Substituting $V_- = V_{1/2}$, $R_4 = R_1 R_3/2$ $(R_1 - R_3)$ and reducing yields $$\frac{V_R}{R_3} + \frac{V_o}{R_3} = 0 \tag{1}$$

or $V_o = -V_R$

Reverse mode:
AS$_1$ closed, AS$_2$ open

V$_o$ may be computed by writing an equation for the capacitor voltage in terms of i$_c$:

$$V_- - V_o = (1/c)\int i_c dt + (V cap)_{t=0}$$

where (V$_{cap}$)$_{t=0}$ is the capacitor voltage at t=0. Since (V$_{cap}$)$_{t=0}$=V$_-$−(V$_o$)$_{t=0}$, the equation becomes $$V_- - V_o + (1/c)\int i_c dt + V_- - (V_o) t = 0$$

or $$V_o = -(1/c)\int i_c dt + (V_o) t = 0$$

To find i$_c$, currents are summed at the V$_-$ junction:

$$\frac{V_I - V_-}{R_1} - \frac{V_-}{R} - i_c = 0$$

which yields i$_c$=(V$_I$/R$_1$), since V$_-$=V$_+$=(V$_I$/2)

Hence $$V_o = -\frac{1}{c}\int \frac{V_I}{R_1} dt + (V_o)_{t=o} = -\frac{1}{R_1 C}\int V_I dt + (V_o)_{t=o} \quad (2)$$

Forward mode:
AS$_1$ open, AS$_2$ open
As before, $$V_o = -(1/c)\int i_c td + (V_o) t = 0$$

where t=0 represents the start of Forward.
The current summation of V$_-$ junction is $$(V_-/R_1) - i_c = 0$$

Since V$_-$=V$_+$=V$_{I/2}$, this becomes $$i_c = -\frac{V_I}{2R_1}, \quad (3)$$

hence $$V_o = -\frac{1}{c}\int (-\frac{V_I}{2R_1}) dt + (V_o)_{t=o}$$

$$= \frac{1}{2R_1 C}\int V_I dt + (V_o)_{t=o}$$

Equations (2) and (3) show that the gain factors during Reverse and Forward are −1/R$_1$c and ½R$_1$c, respectively.

Figure 16:
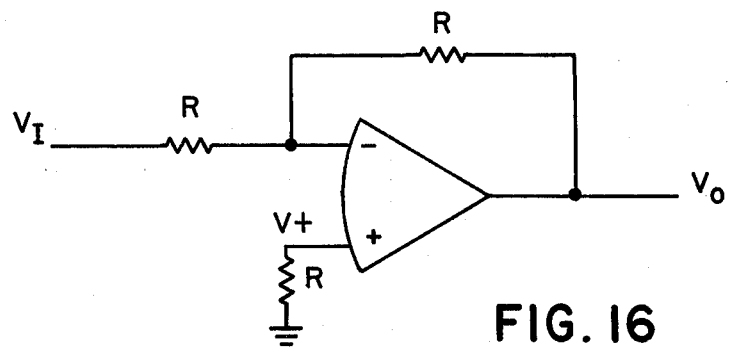

FIG. 16 illustrates the standard analog inverter circuit. The current equation is V$_o$−V$_-$/R=V$_-$−V$_I$/R; since V$_-$=V$_+$=0 this reduces to V$_o$=−V$_I$.

Figure 17:
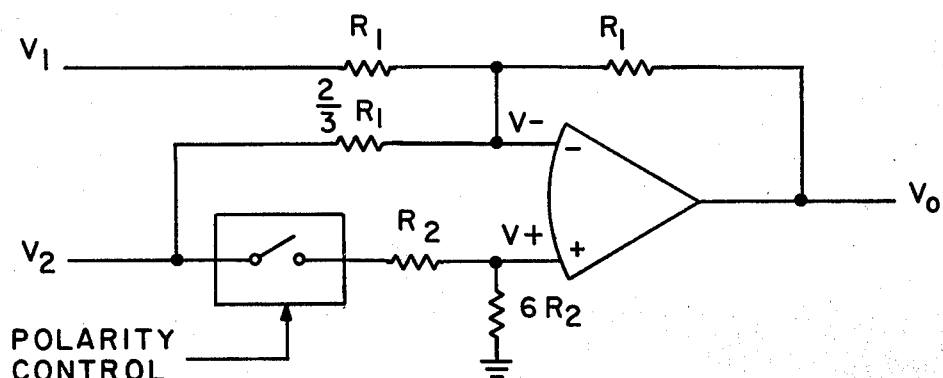

FIG. 17 gives a circuit for a special analog summer with polarity control, shown symbolically in FIG. 6C.

For polarity control high (AS$_1$ open):

$$V_+ = V_- = 0;$$
$$\frac{V_1 - V_-}{R_1} + \frac{V_2 - V_-}{\frac{2}{3} R_1} + \frac{V_o - V_-}{R_1} = 0$$

which reduces to $$V_o = -(3/2) V_2 - V_1.$$

For polarity control low (AS$_1$ closed):

$$V_+ = V_- = 6/7 \, V_2;$$
$$\frac{V_1 - V_-}{R_1} + \frac{V_2 - V_-}{\frac{2}{3} R_1} + \frac{V_o - V_-}{R_1} = 0$$

which now reduces to $$V_o = +(3/2) V_2 - V_1.$$

Figure 18:
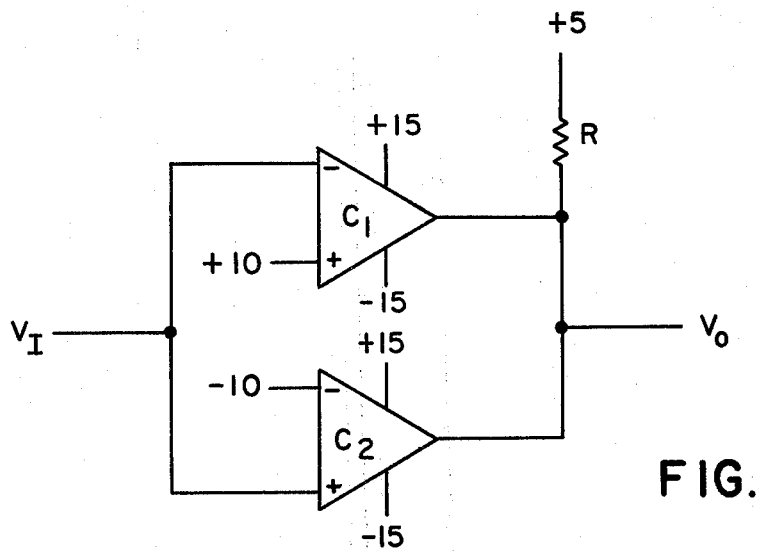

FIG. 18 illustrates a standard analog limit comparator circuit which realizes the limit sensor shown symbolically in FIG. 6E. C1 and C2 are special operational amplifiers, called comparators, designed to be used without feedback; furthermore the comparators in FIG. 18 have open collector outputs and operate with power supply voltages of +15 V and −15 v. For each comparator the output is a high impedance to ground when V$_+$ exceeds V$_-$, and the output is at −15 volts when V$_-$ exceeds V$_+$. Thus in the circuit shown, if the load impedance to which V$_o$ is connected is large relative to R, V$_o$ will be at +5 volts when V$_I$ lies between −10 volts and +10 volts; if V$_I$ exceeds +10 volts then C1 will bring V$_o$ to −15 volts, and if V$_I$ is less than −10 volts then C2 will bring V$_o$ to −15 volts.

Figure 19:
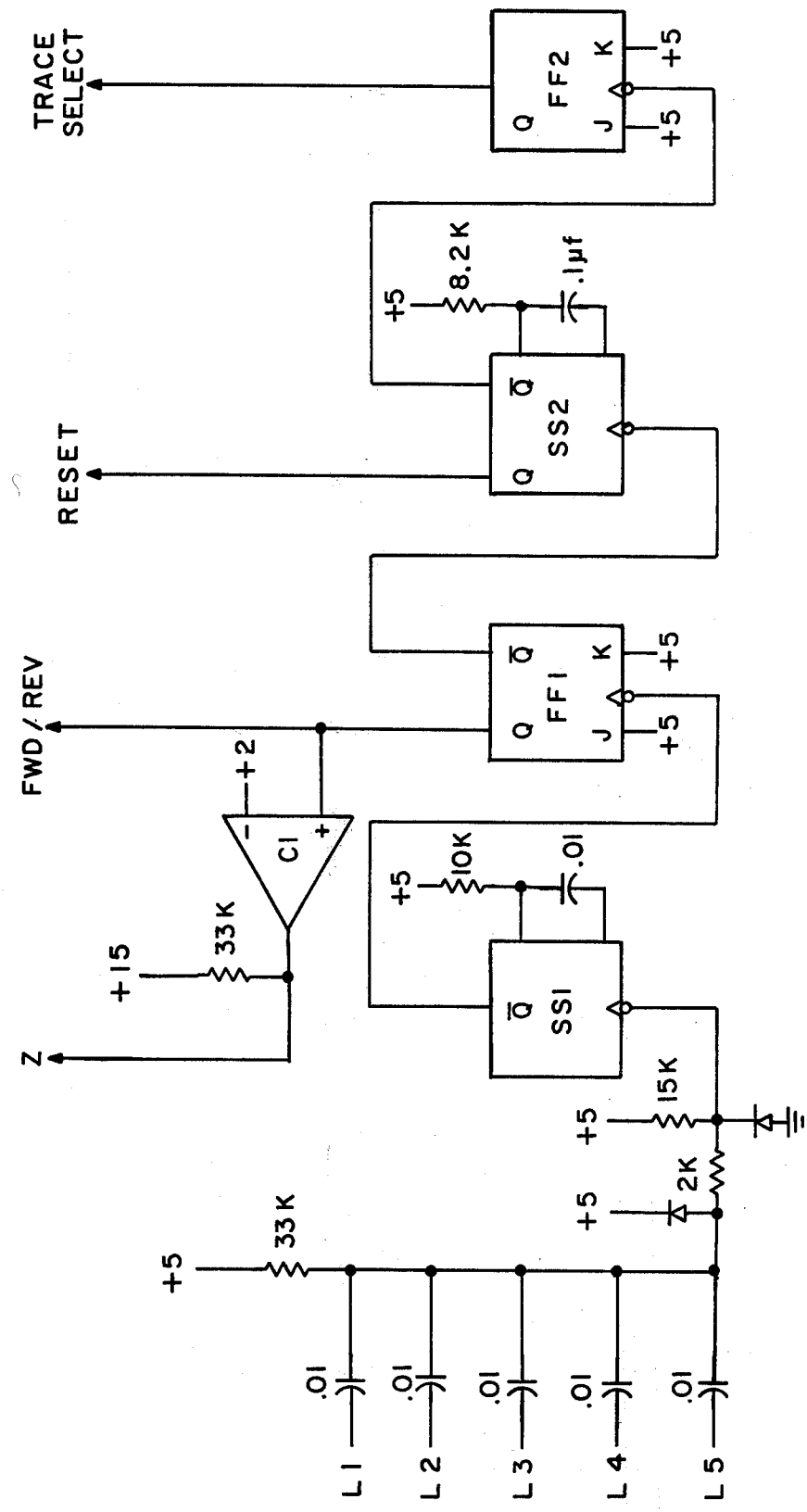

FIG. 19 presents the circuit shown in block form in FIG. 7A which produces the mode timing signals. FF1 and FF2 are JK type flip-flops such as those contained in standard integrated circuit type 7473; SS1 and SS2 are monostable multivibrators such as those contained in standard integrated circuit type 74123; C1 is an analog comparator, such as standard integrated circuit type 710, with ±15 volts supply voltages. The operation is as follows:

1. A trigger L$_i$ from any of the limit sensors appears as a negative pulse at the clock input of SS1, which shapes and lengthens the pulse. The fortified signal appears at the $\overline{Q}$ output of SS1 as a negative pulse.

2. The fortified trigger toggles FF1, that is, the trigger changes FF1 from whatever state it is in to the opposite one. The Q output of FF1 is the FWD/REV signal.

3. A negative-going voltage change at the $\overline{Q}$ output of FF1, which occurs at the transition from Forward to Reverse, will trigger SS2, which is timed to produce a gate of duration equal to the desired Rest duration. The Q output of SS2 is the RESET signal.

4. A negative-going voltage change at the $\overline{Q}$ output of SS2, which occurs at the trailing edge of the RESET signal, causes FF2 to change state. The Q output of FF2 is the TRACE SELECT signal.

5. Comparator C1 translates the +5 and 0 levels of the FWD/REV signal to +15 volts and −15 volts, respectively, to form the z (trace intensity) signal to the display unit.

Although the present invention has been described with reference to particular embodiments, it will be apparent to those skilled in the art that variations and modifications can be substituted therefor without departing from the principles and spirit of the invention.

I claim:

1. Apparatus for displaying graphically a mathematical function, plotted on one coordinate of a two-dimensional rectangular coordinate display graph, of a variable, plotted on the other coordinate of the display graph, such apparatus comprising:

at least one integrator, responsive to a reset control signal, and a forward/reverse signal, each of which signals have high and low logic levels, a reset value signal, and a voltage input signal $V_i$, such integrator providing a voltage output $V_o$ being the sum of (i) a voltage constant k, capable of being established at the time the reset control signal impressed on the integrator is high, and which voltage constant is linearly related to the reset value signal, and (ii) some constant c times the integral of the voltage input signal over the time beginning immediately after the reset control signal has returned to a low logic level after being at a high logic level, wherein the constant c is equal to a given value d when the forward/reverse signal is high and is equal to minus $d'$ times the given value when the forward/reverse signal is low, wherein $d'$ is $\geq 1$;

whereby the integrator output $V_o$ is reflective of the formula $V_o = k + d \int V_i\, dt$, when the forward/reverse signal is high and the reset control signal is low and therefore the apparatus is in a plotting mode, and whereby the integrator output $V_o$ is reflective of the formula $V_o = k - d' \int V_i\, dt$, when the forward/reverse signal is low and the reset control signal is low and therefore the apparatus is in a retrace mode;

at least one limit sensor, the input of which is connected to the output of an integrator included among the at least one integrator, such limit sensor having one voltage output when its voltage input is within predetermined limits and another voltage output when its voltage input is outside those limits, first means, for generating a forward/reverse signal, responsive to each limit sensor included among the at least one limit sensor, the output of such first means being connected to the forward/reverse signal input of each integrator, such first means output toggling between high and low logic levels each time any limit sensors indicates an outside-limit condition, i.e. such output, if high, becoming low, or, if low, becoming high, when an outside-limit condition is indicated;

second means, for generating a reset control signal, responsive to at least one limit sensor, the output of such second means being connected to the reset control signal input of each integrator included among the at least one integrator, such means generating a low logic level signal unless any limit sensor indicates an outside-limit condition while the forward/reverse signal is low, whereupon the reset control signal is at a high logic level for a duration sufficient to allow all integrator outputs to reach equilibrium;

third means, for generating a trace select signal, responsive to the states of the Reset control signal and of the forward/reverse signal, such third means output toggling between high and low logic levels, and changing state each time the reset control signal becomes too high;

means for connection to an oscilloscope of the type having separate x and y inputs for electronic signals representative of horizontal and vertical rectangular coordinate respectively;

and a third input hereinafter referred to as the z input, for intensity modulation or the display of the coordinate pair represented at the x and y inputs; such means hereinafter referred to as "x outputs" as to the element of such means for connection to the x input, "y output" as to the element of such means for connection to the y input, and "z output" as to the element of such means for connection to the z input;

at least two integrators connected in tandem;

an electronic switch, itself connected switchably to the y output, such electronic switch alternately connecting the y output to a signal emerging from either of two different integrators; such electronic switch changing state in response to a digital signal present at an electronic switch input, such electronic switch input connected to the trace select signal; and means for generating a trace blanking signal, such signal having the same digital states as the forward/reverse signal, and such trace blanking signal connected to the z output, so that the display is blanked whenever the trace blanking signal is high and thus operative only when the forward/reverse signal is low.

* * * * *